Oct. 3, 1933.    J. G. W. FIELD    1,928,721
DISTRIBUTING MECHANISM OF TYPOGRAPHICAL COMPOSING AND CASTING MACHINES
Filed Dec. 16, 1931
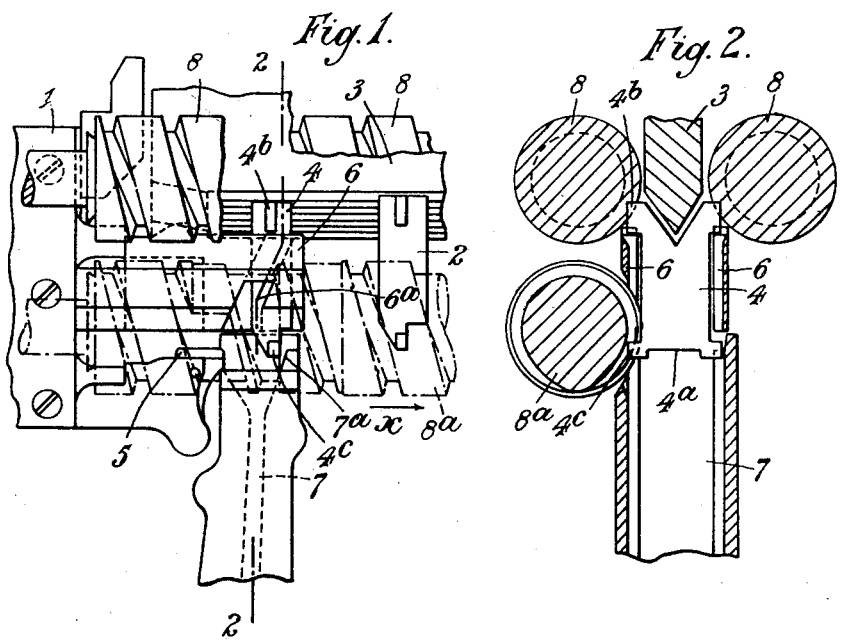
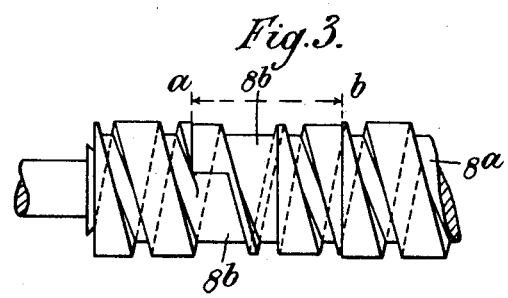
Inventor.
Joseph G. W. Field Patented Oct. 3, 1933

1,928,721

UNITED STATES PATENT OFFICE 1,928,721

DISTRIBUTING MECHANISM OF TYPOGRAPHICAL COMPOSING AND CASTING MACHINES

Joseph Gracie Winter Field, Altrincham, England, assignor to Linotype and Machinery Limited, London, England Application December 16, 1931, Serial No. 581,321, and in Great Britain January 15, 1931

13 Claims. (Cl. 199—40)

This invention relates to the distributing mechanism of typographical composing and casting machines such as those known commercially under the registered trade mark "Linotype".

More particularly, it relates to that type of distributing mechanism in which matrices to be distributed to a plurality of magazines are separated according to font in a primary distributor box by which certain of the matrices are guided to the distributor appropriate to one magazine, while the remaining matrices are passed into a chute through which they fall by gravity to a second distributor box to be fed to the distributor appropriate to another magazine.

In mechanism of this kind as usually constructed, the primary distributor box comprises short rails on which the matrices to be delivered to the second distributor box are suspended by their upper ears until they are conveyed beyond the end of the rails, to fall by gravity into the chute and through said chute to the lower distributor box.

The object of the present invention is to provide an improved form of distributor box rails which will ensure the matrices being positively guided during their descent into the chute entrance. To this end the distributor box rails are arranged to extend over and beyond the entrance of the chute and are provided on their inner faces with grooves extending from top to bottom of the rails, the lower ends of the grooves registering with the mouth of the chute. The upper ears of the matrices conveyed along the rails by the distributor screws, drop into said grooves and are thereby guided into the chute.

As matrices thus guided would, with the form of distributor screws usually employed, foul the lower distributor screws in their downward path, the present invention includes a modified form of such lower distributor screw by which the matrices are enabled to pass that screw and enter the chute without any impedance whatever. The modification in question consists in reducing the width of the thread of said lower screw in the region of the entrance to the chute and in reducing the external diameter of the screw in the same region. The reduction of the width of the thread enables the upper ears of the matrices to pass through the groove between the thread, the grooves in the distributor box rail being preferably formed at an angle to the vertical to ensure such passage of the said ears. The reduction in the external diameter of the thread prevents the fouling thereof by the bodies of the matrices.

The invention will now be more particularly described by reference to the accompanying drawing, in which certain of the parts are diagrammatically represented, and in which:—

Figure 1 is a front elevation of the pertinent parts of a machine embodying the present improvements shown partly broken away and with the lower distributor screw, represented in dot and dash lines;

Figure 2 is a transverse vertical section through the distributor screws and chute taken on or about the line 2—2 of Figure 1 as viewed from the right of that figure, and Figure 3 is an elevation of part of the lower distributor screw.

In Figure 1 of this drawing, 1 indicates the primary distributor box by which matrices, such as that marked 2, are guided on to a ribbed distributor bar 3, from which they are released in the now well-known manner, so that they shall be distributed each according to character into the respective channel of the magazine appropriate to the matrix font to which 2 belongs.

The machine under review is designed to deal with matrices of two distinct fonts, the matrices of the respective fonts, as is common in the art, being distinguished by the fact that those of the font exemplified by 2 have their feet plain or unnotched, while each of those of the other font of which that marked 4 is an example, has its foot notched or recessed as at $4^a$, Figure 2.

The matrices 2 and 4 are separated from each other according to font by the well-known font distinguisher 5 which supports the on-coming matrices 2 at a higher level so that their tooth combinations are caused to engage with the distributor bar 3, while the matrices 4, deprived of such support, by reason of their recessed feet, fall to a slightly lower level which prevents their toothed combination from engaging with the distributor bar 3. At this stage, the matrices 4 are suspended by their upper ears $4b$ which then are travelling on the short rails 6, this condition obtaining until the said matrices are allowed to fall from the rails 6 into the chute 7 by which they are conducted to the mechanism which distributes them according to character each into its respective channel of the pertinent magazine.

The just-named falling of the matrices into the chute 7, has heretofore resulted from the rails 6 terminating immediately above the entrance $7^a$ to said chute, the matrices dropping over the ends of the rails and for a brief period thereafter being deprived of any guidance to direct them properly into the chute. This absence of efficient guidance has sometimes been causative of interrupted operation of the machine and it is the aim of this invention to overcome that difficulty.

To that end the present improvements involve the extension of the rails 6 beyond the chute mouth 7a and the provision of grooves 6a extending from top to bottom of the inner faces of said rails and at their lower ends registering with the chute mouth 7a.

As is well-known the matrices 4 are traversed along the rails 6 by the distributor screws 8 and 8a, which respectively engage the upper ears 4b and the front lower ears 4c. As matrices, thus guided by the grooves 6a would, if the lower distributor screw 8a were of the usual construction, foul that screw in their downward path, the said screw, in accordance with the present invention, has its thread, in the region of the chute entrance 7a, reduced in both its width and its external diameter as shown best in Figures 2 and 3.

The reduction in width of the thread of the screw 8a, extends through about one and a quarter convolutions and enables the upper matrix ears 4b to pass through the considerably widened groove 8b between the thus reduced thread, while the reduction in external diameter of the thread (which extends from $a$ to $b$ of Figure 3) prevents the bodies of the falling matrices from contacting with the screw 8a.

The rotation of the screws 8, 8a, causes the matrices to be traversed along the rails 6 as ordinarily, in the direction of the arrow $x$ in Figure 1, and, by reference to that figure, it will be noted that the grooves 6a at their upper part, are inclined to the vertical so as to ensure the passage of the upper matrix ears 4b through the widened groove 8b of the screw 8a.

Having described my invention, I declare that what I claim and desire to secure by Letters Patent is:—

1. In distributing mechanism of typographical composing and casting machines, a primary distributor box adapted to separate matrices according to font and comprising a selecting bridge for directing matrices of one font at an upper level onto a distributor bar and for permitting matrices of another font to be supported at a lower level clear of said bar, and rails furnishing such support to the matrices of the latter font and along which said matrices are caused to travel preparatory to falling therefrom by gravity, said rails being provided with grooves adapted to permit the falling of the matrices from the rails and acting to engage and guide the matrices during their descent.

2. In distributing mechanism of typographical composing and casting machines, a primary distributor box adapted to separate matrices according to font, comprising rails along which matrices of one font are caused to travel preparatory to falling therefrom by gravity, said rails being provided with grooves in part inclined to the vertical adapted to engage and guide the matrices during their descent.

3. In distributing mechanism of typographical composing and casting machines, the combination with a primary distributor box adapted to separate matrices according to font, comprising rails along which matrices of one font are caused to travel preparatory to falling therefrom by gravity, said rails being provided with grooves adapted to engage and guide the matrices during their descent, of distributor screws adapted to traverse the matrices along the rails, one of which has its thread reduced both in thickness and external diameter at a part thereof adjacent the rail grooves.

4. In distributing mechanism of typographical composing and casting machines, the combination with a primary distributor box adapted to separate matrices according to font, comprising rails along which matrices of one font are caused to travel preparatory to falling therefrom by gravity, said rails being provided with grooves in part inclined to the vertical adapted to engage and guide the matrices during their descent, of distributor screws adapted to traverse the matrices along the rails, one of which has its thread reduced both in thickness and external diameter at a part thereof adjacent the rail grooves.

5. In distributing mechanism of typographical composing and casting machines, the combination with a primary distributor box adapted to separate matrices according to font, comprising rails along which matrices of one font are caused to travel preparatory to falling therefrom by gravity, said rails being provided with grooves adapted to engage and guide the matrices during their descent, of distributor screws adapted to traverse the matrices along the rails, one of which has its thread reduced in thickness at a part thereof adjacent the rail grooves.

6. In distributing mechanism of typographical composing and casting machines, the combination with a primary distributor box adapted to separate matrices according to font, comprising rails along which matrices of one font are caused to travel preparatory to falling therefrom by gravity said rails being provided with grooves in part inclined to the vertical adapted to engage and guide the matrices during their descent, of distributor screws adapted to traverse the matrices along the rails, one of which has its thread reduced in thickness at a part thereof adjacent the rail grooves.

7. In distributing mechanism of typographical composing machines, the combination of a chute adapted to receive matrices from a primary distributor, of a primary distributor box through which matrices are passed for separation according to font, said box comprising a selecting bridge for directing matrices of one font at an upper level onto a distributor bar and for permitting matrices of another font to be supported at a lower level clear of said bar, and rails adapted to furnish such support to the matrices of the latter font during their passage through the box, said rails extending above and beyond the entrance to the chute and being provided with grooves adapted to permit the falling of the matrices from the rails and acting to engage and guide the matrices during their descent into the chute.

8. In distributing mechanism of typographical composing machines, the combination with a chute adapted to receive matrices from a primary distributor, of a primary distributor box through which matrices are passed for separation according to font, comprising rails adapted to support the matrices of one font during their passage through the box, said rails extending above and beyond the entrance to the chute and being provided with grooves in part inclined to the vertical by which the matrices are permitted to fall and are guided during their descent into the chute.

9. In distributing mechanism of typographical composing machines, the combination of a chute adapted to receive matrices from a primary distributor and a primary distributor box through which matrices are passed for separation according to font, comprising rails adapted to support the matrices of one font during their passage through the box, said rails extending above and beyond the entrance to the chute and being provided with grooves in part inclined to the vertical by which the matrices are permitted to fall and are guided during their descent into the chute, of distributor screws adapted to traverse the matrices along the rails, one of which has its thread reduced in thickness at a part thereof adjacent the entrance of the chute.

10. In distributing mechanism of typographical composing machines, the combination of a chute adapted to receive matrices from a primary distributor and a primary distributor box through which matrices are passed for separation according to font, comprising rails adapted to support the matrices of one font during their passage through the box, said rails extending above and beyond the entrance to the chute and being provided with grooves in part inclined to the vertical by which the matrices are permitted to fall and are guided during their descent into the chute, of distributor screws adapted to traverse the matrices along the rails, one of which has its thread reduced both in thickness and external diameter at a part thereof adjacent the entrance of the chute.

11. In distributing mechanism of typographical composing and casting machines, a primary distributor box adapted to separate matrices according to font, comprising rails on which matrices of one font are supported by their upper ears, and upper and lower distributor screws adapted to traverse the matrices along said rails preparatory to the matrices falling therefrom by gravity, said rails being provided with opposed parallel grooves adapted to engage the upper ears of the matrices during their descent and guide one of said ears of each matrix through the groove of the lower distributor screw.

12. In distributing mechanism of typographical composing and casting machines, a primary distributor box adapted to separate matrices according to font, comprising rails on which matrices of one font are supported by their upper ears, and upper and lower distributor screws adapted to traverse the matrices along said rails preparatory to the matrices falling therefrom by gravity, said rails being provided with opposed parallel grooves adapted to engage the upper ears of the matrices during their descent and guide one of said ears of each matrix through the groove of the lower distributor screw, the thread of said distributor screw in the region of the rail grooves being cut away along its rear side to widen the screw groove in facilitating the guiding of the matrices therethrough.

13. In distributing mechanism of typographical composing and casting machines, a primary distributor box adapted to separate matrices according to font, comprising rails on which matrices of one font are supported by their upper ears, and upper and lower distributor screws adapted to transverse the matrices along said rails preparatory to the matrices falling therefrom by gravity, said rails being provided with opposed parallel grooves adapted to engage the upper ears of the matrices during their descent and guide one of said ears of each matrix through the groove of the lower distributor screw, the thread of said distributor screw in the region of the rail grooves being cut away along its rear side through approximately $1\frac{1}{4}$ convolutions so as to widen the screw groove in facilitating the guiding of the matrices therethrough.

JOSEPH GRACIE WINTER FIELD.